United States Patent
Capisani et al.

(10) Patent No.: US 12,319,755 B2
(45) Date of Patent: Jun. 3, 2025

(54) PROCESS AND SYSTEM FOR COLLECTING CATALYST OR POLYMER SAMPLES FROM AN OPERATION UNIT OF A POLYMERIZATION PLANT

(71) Applicant: BASELL POLIOLEFINE ITALIA S.R.L., Milan (IT)

(72) Inventors: Paolo Capisani, Ferrara (IT); Nicolo Arich De Finetti, Ferrara (IT); Pietro Baita, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 626 days.

(21) Appl. No.: 17/778,182

(22) PCT Filed: Nov. 9, 2020

(86) PCT No.: PCT/EP2020/081425
§ 371 (c)(1),
(2) Date: May 19, 2022

(87) PCT Pub. No.: WO2021/104837
PCT Pub. Date: Jun. 3, 2021

(65) Prior Publication Data
US 2022/0403064 A1     Dec. 22, 2022

(30) Foreign Application Priority Data
Nov. 25, 2019 (EP) .................................. 19211229

(51) Int. Cl.
*C08F 10/00*       (2006.01)
*B01J 8/00*        (2006.01)
(Continued)

(52) U.S. Cl.
CPC ............... *C08F 10/00* (2013.01); *B01J 8/001* (2013.01); *B01J 8/004* (2013.01); *B01J 8/006* (2013.01);
(Continued)

(58) Field of Classification Search
USPC ......................................... 528/502 A; 436/37
See application file for complete search history.

(56) References Cited

U.S. PATENT DOCUMENTS 6,998,269 B2 *   2/2006   Kristen ................... C08F 10/06
                                                          702/30

FOREIGN PATENT DOCUMENTS

EP      1099473 A1    5/2001
EP      2336200 A1    6/2011
(Continued)

OTHER PUBLICATIONS

International Search Report and Written Opinion Mailed Mar. 17, 2021 (Mar. 17, 2021) for corresponding PCT/EP2020/081425.

*Primary Examiner* — Fred M Teskin (57) ABSTRACT

A process (and a related system) for collecting samples of a polymerization catalyst or of a catalyst-containing polymer from an operation unit, having an upper end and a lower end, of a polymerization plant, including the steps of:
a) extracting a prefixed amount of product from the lower end of the operation unit through a discharge valve;
b) directing the product towards a filtering unit through an inlet valve;
c) flushing an inert gas through the filtering unit;
d) outgassing the filtering unit, through the outlet valve; and
e) displacing the filtering unit, for collecting the sample.

12 Claims, 3 Drawing Sheets

(51) Int. Cl.
  *B01J 19/24* (2006.01)
  *C08F 2/01* (2006.01)
(52) U.S. Cl.
  CPC ............ *B01J 19/2435* (2013.01); *C08F 2/01* (2013.01); *B01J 2208/00628* (2013.01); *B01J 2208/00654* (2013.01); *B01J 2208/00761* (2013.01); *B01J 2219/00423* (2013.01); *B01J 2231/12* (2013.01)

(56) References Cited

FOREIGN PATENT DOCUMENTS

| | | |
|---|---|---|
| WO | 9635936 A1 | 11/1996 |
| WO | 2019141521 A1 | 7/2019 |

\* cited by examiner

PROCESS AND SYSTEM FOR COLLECTING CATALYST OR POLYMER SAMPLES FROM AN OPERATION UNIT OF A POLYMERIZATION PLANT

This application is the U.S. National Phase of PCT International Application PCT/EP2020/081425, filed Nov. 9, 2020, claiming benefit of priority to European Patent Application No. 19211229.0, filed Nov. 25, 2019, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a process and a system for collecting samples of a polymerization catalyst or of a catalyst-containing polymer from an operation unit of a polymerization plant.

BACKGROUND OF THE INVENTION

In some instances, the continuous processes of olefins polymerization are carried out by a gas-phase polymerization or a slurry polymerization. In some instances, these processes are carried out in the presence of a polymerization catalyst system. In some instances, the processes include a prepolymerization step, wherein the polymerization catalyst system is subjected to a prepolymerization to prevent reactor overheating. Successively, the obtained prepolymer is fed to a polymerization reactor.

In some instances and whether pre-polymerized or not, catalyst and cocatalyst are precontacted to activate the catalyst system.

In some instances, the prepolymerization step is carried out in a liquid medium in a prepolymerization unit such as a loop reactor or a continuous stirred tank reactor (CSTR).

To evaluate the prepolymer features (including degree of prepolymerization, yield of prepolymer, and quality of prepolymer), an amount of slurry is extracted and collected from the prepolymerization unit.

In some instances, the step of collecting the prepolymerized catalyst sample is carried out through a centrifugal separator (cyclone) of the axial, spiral, helical or tangential type.

In some instances and after the extracted slurry is conveyed into the centrifugal separator, a gas discharge valve is opened to off-gas. Because the particles have a diameter smaller than 100 microns, the finest particles are expelled together with gases. Moreover, the amount of slurry collected at the lower portion of the centrifugal separator is scarce. In some instances, the collected slurry is damaged because by the centrifugal force and the differential pressure. In some instances, the slurry contacts the atmosphere and is exposed to pollution. In some instances, the collected slurry contains catalyst residues, which are toxic for the operators.

Similar problems apply to a precontacting vessel and to a polymerization reactor when a sample of the product is collected.

SUMMARY OF THE INVENTION

In a general embodiment, the present disclosure provides a process for collecting samples of a polymerization catalyst or a catalyst-containing polymer from an operation unit of a polymerization plant.

In a general embodiment, the present disclosure provides a process for collecting samples of a polymerization catalyst or a catalyst-containing polymer which is not hazardous for the operators.

In a general embodiment, the present disclosure provides a process for collecting samples of a polymerization catalyst or of a catalyst-containing polymer from an operation unit, having an upper end and a lower end, of a polymerization plant, including the steps of:
a) extracting a prefixed amount of product from the lower end of the operation unit through a discharge valve;
b) directing the product towards a filtering unit through an inlet valve;
c) flushing an inert gas through the filtering unit;
d) outgassing the filtering unit, through an outlet valve; and
e) displacing the filtering unit, for collecting the sample.

DETAILED DESCRIPTION OF THE INVENTION

In some embodiments, the gases are purged through a filter, thereby retaining the particles and an amount of sample. In some embodiments, step e) of displacing the filtering unit allows opening the filtering unit and extracting the sample. In some embodiments, the filtering unit is located under an extractor or a fume hood.

In some embodiments and after step (a), the process further includes the step of:
a1) collecting the product in an intermediate capacity pipe.

It is believed that step (a1) allows the filtering unit to avoid being in direct contact with the operation unit, thereby preventing pressure fluctuations on the filtering unit.

In some embodiments and after step (b), the process further includes the step of:
b1) outgassing the filtering unit, through the outlet valve.

It is believed that step (b1) facilitates removal of gas components and provides space for the inert gas.

In some embodiments, steps c) and d) are repeated at least three times, thereby removing the gas components from the sample.

In some embodiments, the samples are undamaged and uncontaminated. In some embodiments, the process is safe for operators.

In some embodiments, the present disclosure provides a system for collecting samples of a polymerization catalyst or of a catalyst-containing polymer from an operation unit, having an upper end and a lower end, of a polymerization plant, wherein the system is made from or containing:

a discharge valve, connectable to the operation unit, for extracting a predetermined amount of product from the lower end of the operation unit;

an inlet valve for conveying the product to a filtering unit;

a filtering unit for filtering the product, the filtering unit being displaceable;

a first inert gas inlet valve for flushing an inert gas through the filtering unit;

an outlet valve for outgassing the filtering unit; and connection piping.

In some embodiments, the samples are undamaged and uncontaminated. In some embodiments, the system is safe for operators.

In some embodiments, the filtering unit of the system is made from or containing:

a head flange made from or containing an inlet opening;

a bottom body, connectable to the head flange, made from or containing a filter housing and an outlet opening; and a mechanical filter located in the filter housing of the bottom body.

In some embodiments, the filter is a metal filter. In some embodiments, the filter is a steel net or a synthetic, stainless steel filter.

In some embodiments, the system for collecting samples of prepolymerized polymerization catalyst further includes:

an intermediate capacity pipe located upstream of the filtering unit, for containing a predetermined amount of product leaving the operation unit through the discharge valve;

an intermediate capacity inlet valve located upstream of the intermediate capacity pipe; and an intermediate capacity outlet valve located downstream of the intermediate capacity pipe.

It is believed that the intermediate capacity pipe and the relevant valves thereof allows collecting a predetermined amount of product and avoiding direct contact of the filtering unit with the operation unit, thereby preventing pressure fluctuations on the filtering unit.

In some embodiments, the system is further made from or containing an intermediate capacity pipe and a second inert gas inlet valve for flushing inert gas therethrough, thereby allowing the product to enter the filter unit.

In some embodiments, the system for collecting samples is made from or containing a pressure sensor. In some embodiments, the pressure sensor is placed downstream the filtering unit, thereby ascertaining the pressure in the filtering unit.

In some embodiments, the discharge valve is a piston valve and at least one of the inlet valve and the outlet valve is a spring-loaded valve.

In some embodiments, the present disclosure provides an operation unit of a polymerization plant made from or containing a system for collecting samples of a polymerization catalyst or a catalyst-containing polymer.

In some embodiments, the lower end of the operation unit is made from or containing a rounded portion, jointed to two vertical portions, wherein a nozzle for connecting the discharge valve is positioned, thereby forming an angle α with the vertical portions. In some embodiments, angle α is a 45° angle. It is believed that this position allows collecting a higher amount of product.

In some embodiments, the operation unit is a prepolymerization unit, a precontacting vessel, or a polymerization reactor.

As used herein, the term "catalyst" refers to a catalyst system made from or containing one or more different catalyst components, with or without cocatalysts.

As used herein, the term "operation unit" refers to a unit of the polymerization plant wherein an operation is carried out. In some embodiments, the operation unit is a precontacting vessel, a prepolymerization unit, or a polymerization reactor.

In FIGS. 1-6, a system 1 for collecting samples of a polymerization catalyst or of a catalyst-containing polymer from an operation unit of a polymerization plant, is depicted. System 1 is applied to an operation unit 2 of a polymerization plant.

In some embodiments, the operation unit 2 is a prepolymerization unit of a gas-phase polymerization reactor. The gas-phase reactor is a fluidized bed reactor, a stirred bed reactor, a multizone circulating reactor or a different gas-phase reactor, for gas-phase polymerization processes. In some embodiments, the polymerization reactor is a slurry reactor.

In this reactor, polymerization of olefins is carried out in the presence of a polymerization catalyst. In some embodiments, the olefins are alpha-olefins. In some embodiments, the polymerization catalyst is subjected to a prepolymerization step before entering the polymerization reactor.

The process is not restricted to the use of any family of polymerization catalysts. In some embodiments, the process includes an exothermic polymerization reaction, employing a catalyst, whether the catalyst is supported or unsupported.

In some embodiments, the catalytic systems are selected from the group consisting of Ziegler-Natta catalysts, single site catalysts, chromium-based catalysts, and vanadium-based catalysts.

A Ziegler-Natta catalyst system is made from or containing the catalysts obtained by the reaction of a transition metal compound of groups 4 to 10 of the Periodic Table of Elements (new notation) with an organometallic compound of group 1, 2, or 13 of the Periodic Table of Elements. In some embodiments, the transition metal compound is selected from the group consisting of compounds of Ti, V, Zr, Cr, and Hf. In some embodiments, the compounds have the formula Ti(OR)nXy-n, wherein n is between 0 and y; y is the valence of titanium; X is halogen and R is a hydrocarbon group having 1-10 carbon atoms or a COR group. In some embodiments, the compounds are titanium compounds having at least one Ti-halogen bond. In some embodiments, the titanium compounds are selected from the group consisting of titanium tetrahalides or halogenalcoholates.

In some embodiments, the titanium compounds are selected from the group consisting of $TiCl_3$, $TiC_4$, $Ti(OBu)_4$, $Ti(OBu)Cl_3$, $Ti(OBu)_2Cl_2$, and $Ti(OBu)_3Cl$.

In some embodiments, the organometallic compounds are organo-Al compounds, alternatively Al-alkyl compounds. In some embodiments, the alkyl-Al compound is a trialkyl aluminum compound. In some embodiments, the trialkyl aluminum compounds are selected from the group consisting of triethylaluminum, triisobutylaluminum, tri-n-butylaluminum, tri-n-hexylaluminum, and tri-n-octylaluminum. In some embodiments, the alkyl-Al compounds are selected from the group consisting of alkylaluminum halides, alkylaluminum hydrides, alkylaluminum sesquichlorides, and mixtures with trialkyl aluminum compounds. In some embodiments, the alkylaluminum sesquichlorides are selected from the group consisting of $AlEt_2Cl$ and $Al_2Et_3Cl_3$.

In some embodiments, the Ziegler-Natta catalysts have the titanium compound supported on magnesium halide in active form. In some embodiments, the magnesium halide is $MgCl_2$ in active form.

In some embodiments, the catalysts are vanadium-based catalysts, which are made from or containing the reaction product of a vanadium compound with an aluminum compound, optionally in the presence of a halogenated organic compound. In some embodiments, the vanadium compound is supported on an inorganic carrier, such as silica, alumina, and magnesium chloride. In some embodiments, the vanadium compounds are selected from the group consisting of $VCl_4$, $VCl_3$, $VOCl_3$, and vanadium acetyl acetonate.

In some embodiments, the catalysts are based on chromium compounds, such as chromium oxide on silica, or Phillips catalysts.

In some embodiments, the catalysts are single site catalysts. In some embodiments, the catalysts are metallocene-based catalyst systems made from or containing:
- at least a transition metal compound containing at least one π bond;
- at least an alumoxane or a compound capable of forming an alkylmetallocene cation; and
- optionally an organo-aluminum compound.

In some embodiments, the metal compounds containing at least one π bond are metallocene compounds having the formula (I):

$$Cp(L)_q AMX_p \quad (I)$$

wherein
- Cp is a substituted or unsubstituted cyclopentadienyl group, optionally condensed to one or more substituted or unsubstituted, saturated, unsaturated, or aromatic rings;
- A has the same meaning of Cp; alternatively, A is a $NR^7$, —O, S, moiety wherein $R^7$ is a hydrocarbon radical containing from 1 to 40 carbon atoms;
- L is a divalent hydrocarbon moiety containing from 1 to 40 carbon atoms, optionally containing up to 5 silicon atoms, bridging Cp and A;
- M is a transition metal belonging to group 4, 5 or to the lanthanide or actinide groups of the Periodic Table of the Elements;
- the substituents X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, wherein $R^6$ is a hydrocarbon radical containing from 1 to 40 carbon atoms;
- p is an integer equal to the oxidation state of the metal M minus 2; and
- q is 0 or 1, being 0 when the bridge L is not present.

In some embodiments, L is a divalent group $(ZR^7_2)_n$ wherein Z being C or Si, and the $R^7$ groups, equal to or different from each other, being hydrogen or a hydrocarbon radical containing from 1 to 40 carbon atoms. In some embodiments, L is selected from the group consisting of $Si(CH_3)_2$, $SiPh_2$, $SiPhMe$, $SiMe(SiMe_3)$, $CH_2$, $(CH_2)_2$, $(CH_2)_3$, and $C(CH_3)_2$. In some embodiments, M is zirconium, titanium, or hafnium. In some embodiments, the substituents X are selected from the group consisting of —Cl, —Br, -Me, -Et, -n-Bu, -sec-Bu, -Ph, -Bz, —$CH_2SiMe_3$, -OEt, -Opr, -Obu, -Obz, and -Nme$_2$.

In some embodiments, the alumoxanes are linear, branched, or cyclic compounds containing at least one group of the type:

wherein the substituents U, same or different, are defined below.

In some embodiments, alumoxanes having the formula:

are linear compounds, wherein $n^1$ is 0 or an integer of from 1 to 40 and where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number.

In some embodiments, alumoxanes having the formula:

are cyclic compounds, wherein $n^2$ is an integer from 2 to 40 and the U substituents are as defined above.

In some embodiments, the prepolymerization is carried out in a liquid medium in a prepolymerization unit. In some embodiments, the prepolymerization unit is a loop prepolymerization unit, a vessel prepolymerization unit, or a continuous stirred tank reactor (CSTR).

In some embodiments, the operation unit 2 is a precontacting vessel, wherein the different compounds of the catalyst system are precontacted to activate the catalyst system.

In some embodiments, the operation unit 2 includes a polymerization reactor. In some embodiments, the operation unit 2 is a polymerization vessel. In some embodiments, the polymerization vessel is selected from the group consisting of tanks, steamers, dryers and devolatilization vessels. In some embodiments, the polymerization vessel contains solid polymer particles, which are being formed or were formed in a polymerization reaction, both in a static form or in a dynamic form. In some embodiments, the polymerization reactors are selected from reactors for gas-phase polymerization and reactors for slurry polymerization.

In some embodiments, the operation unit 2 has an upper end 3 and a lower end 4.

Figure 2:
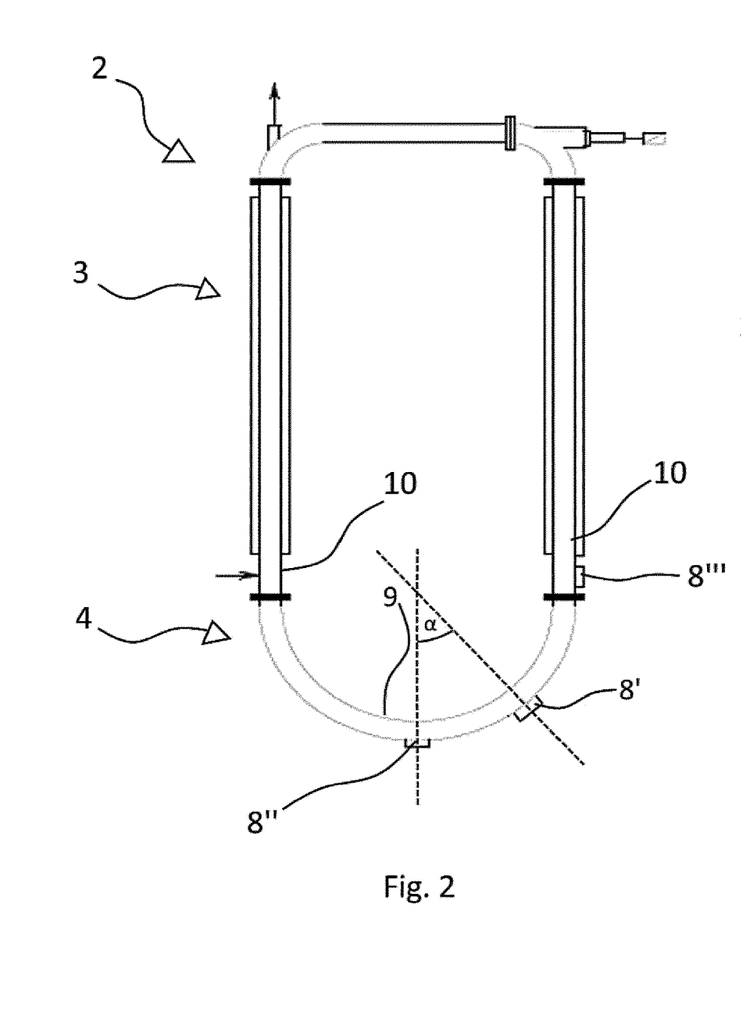
FIG. 2 is a frontal schematic view of a loop prepolymerization unit (operation unit).

In FIG. 2, the operation unit 2 is a loop prepolymerization unit.

As indicated by the lower arrow in FIG. 2, the liquid medium entering the prepolymerization unit is made from or containing an alpha-olefin monomer, optionally with the addition of an inert hydrocarbon solvent. In some embodiments, the inert hydrocarbon solvent is aromatic or aliphatic. In some embodiments, the aromatic solvent is toluene. In some embodiments, the aliphatic solvent is selected from the group consisting of propane, hexane, heptane, isobutene, cyclohexane, and 2,2,4-trimethylpentane. In some embodiments, the prepolymerization is carried out in the absence of inert hydrocarbon solvents or a molecular weight regulator. In some embodiments, the prepolymerization occurs in the presence of a molecular weight regulator. In some embodiments, the molecular weight regulator is hydrogen.

In some embodiments, the average residence time in the prepolymerization unit, is the ratio between the volume of the prepolymerization unit and the volumetric rate of the polymeric slurry discharged from the prepolymerization unit. In some embodiments, the polymeric slurry is discharged from the prepolymerization unit's upper end 3, as shown by the higher arrow in FIG. 2. In some embodiments, the residence time ranges from 2 to 40 minutes.

In some embodiments, the operating prepolymerization temperature ranges from 0° C. to 70° C.

In some embodiments, the polymerization degree of the prepolymerized catalyst ranges from 1 to 800 g per gram of solid catalyst component.

A polymeric slurry containing the prepolymerized catalyst is discharged from the prepolymerization unit before being continuously fed to the polymerization reactor.

Figure 1:
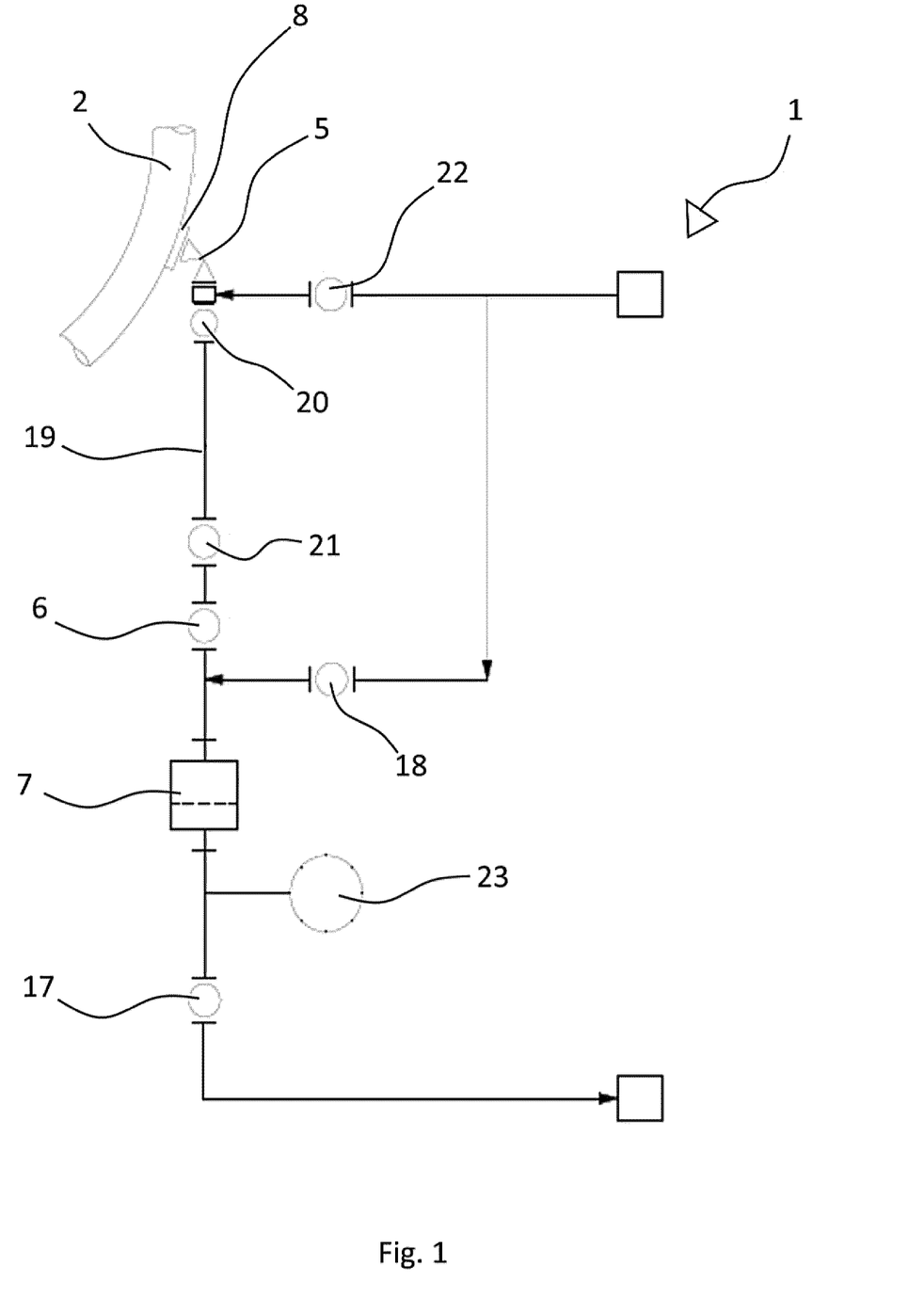
FIG. 1 is a schematic view of the system for collecting samples of a polymerization catalyst or a catalyst-containing polymer from an operation unit.

In FIG. 1, system 1 includes a discharge valve 5, connectable to the prepolymerization unit, for extracting a predetermined amount of product from the lower end 4 of the prepolymerization unit. In some embodiments, the discharge valve 5 is a piston valve, or "ram type" valve.

Figure 3:
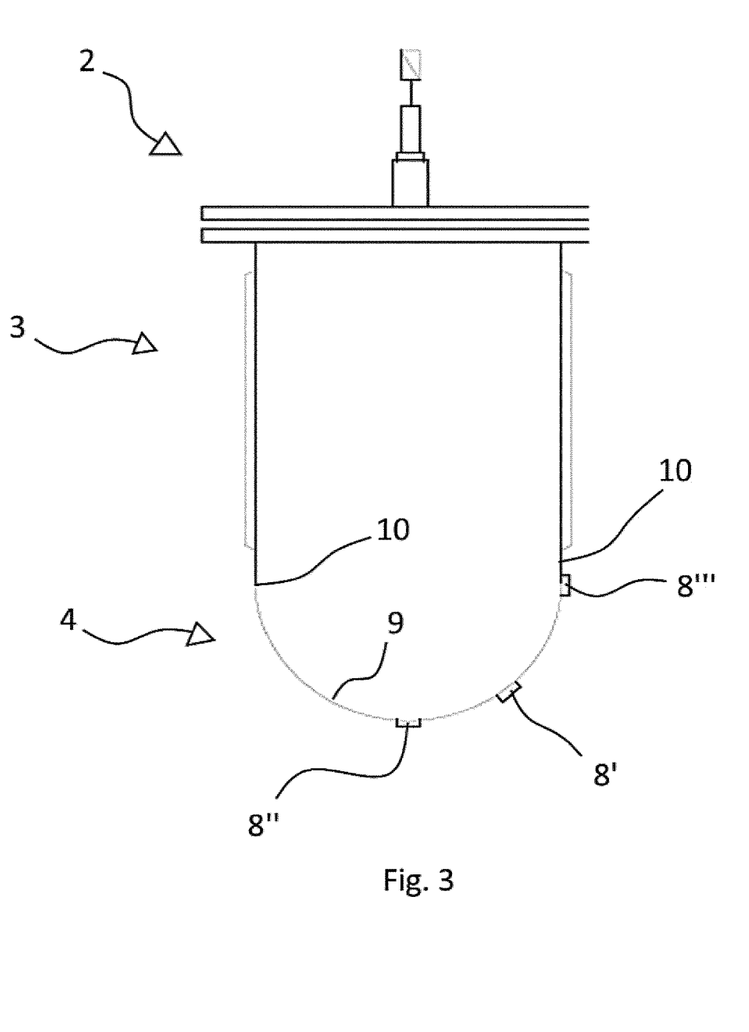
FIG. 3 is a frontal schematic view of an operation unit in the form of a vessel which may be used as a precontacting vessel, as a vessel prepolymerization unit, or as a polymerization vessel.

In some embodiments, the lower end 4 of the prepolymerization unit has a rounded portion 9, jointed to two vertical portions 10, wherein a nozzle 8 for connecting the discharge valve 5 is positioned, thereby forming an angle α with the vertical portions. In some embodiments and as shown in FIG. 2 and FIG. 3, nozzle 8 is placed at different sites. In some embodiments, the prepolymerization unit has three nozzle 8', 8" and 8'". In some embodiments, a single nozzle 8 is provided at the lower end 4 of the prepolymerization unit, for extracting the sample. 8' 8" and 8'" shows three possible locations of the nozzle 8 in the rounded portion 9. In some embodiments, nozzle 8' provides angle α of about 45°. At this position of the prepolymerization unit, there is a high quantity of solid particles in the slurry and therefore, a higher quantity of slurry may be collected. In some embodiments, angle α is of about 0° C., as indicated by nozzle 8". Each position between nozzle 8" and 8'" is a possible position for nozzle 8.

In some embodiments, system 1 has a filtering unit 7 for filtering the extracted slurry.

Figures 4, 5:
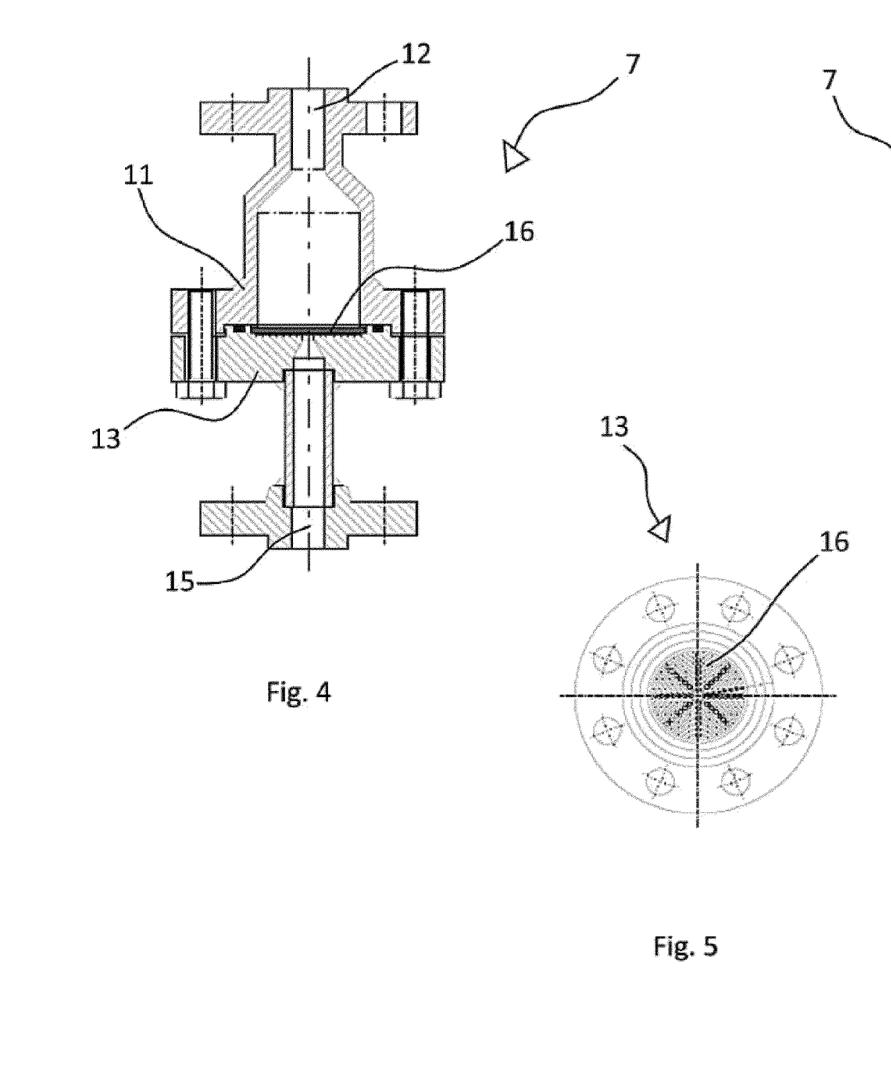
FIG. 4 is a longitudinal sectional view of a filtering unit of the system for collecting samples.
FIG. 5 is a top view of the bottom body, together with the filter, of the filtering unit of FIG. 4.
Figure 6:
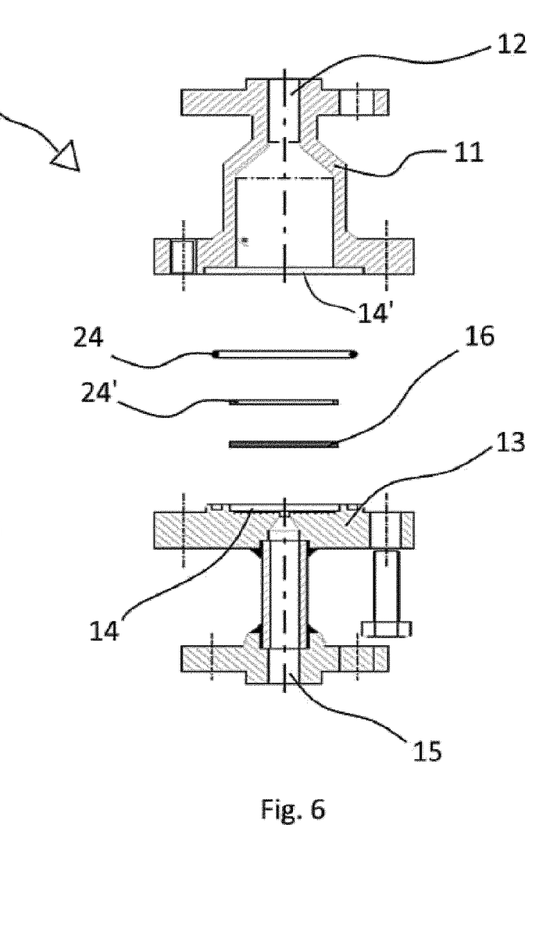
FIG. 6 is an exploded view of FIG. 4.

In FIGS. 4-6, the filtering unit 7 has a head flange 11, provided with an inlet opening 12 for the product to enter the filtering unit 7, and a bottom body 13, connectable to the head flange 11 by a mechanical connector. In some embodiments, the bottom body 13 has a filter housing 14 and an outlet opening 15, for allowing the gases to leave the filtering unit 7.

In some embodiments, the head flange 11 is provided with a filter housing corresponding to filter housing 14.

In some embodiments, the filtering unit 7 has a mechanical filter 16 located within the filter housing 14. In some embodiments, the filter 16 is a metallic filter. In some embodiments, the metallic filter is a steel net filter or a synthetic, stainless steel filter.

In some embodiments, the filtering unit 7 has one or more gaskets, such as one or more o-ring 24 and/or another type of gasket 24'. In some embodiments, a gasket housing 14' is provided in the head flange 11, as shown in FIG. 6, and/or in the bottom body 13.

In some embodiments, the filtering unit 7 is displaceable. As used herein, the term "displaceable" refers to the filtering unit 7 being removable from system 1 and transferable to a different location. In some embodiments, the sample is gathered on filter 16 and collected from filtering unit 7, following displacement of the filtering unit 7 from system 1. In some embodiments, system 1 has a dedicated mechanical connector for connecting removably the filtering unit 7 with the piping of system 1.

In some embodiments, system 1 has an inlet valve 6 for conveying the product to the filtering unit 7. In some embodiments, the inlet valve 6 is located upstream of the filtering unit 7. In some embodiments, the inlet valve 6 is a spring-loaded valve.

In some embodiments, system 1 has an outlet valve 17 for outgassing the filter unit 7, thereby removing the gases from system 1. In some embodiments, outlet valve 17 is a spring-loaded valve.

In some embodiments, system 1 has a first inert gas inlet valve 18 for flushing an inert gas through the filtering unit 7. In some embodiments, the inert gas is nitrogen.

In some embodiments, the system 1 for collecting samples, further has an intermediate capacity pipe 19, for containing a predetermined amount of product leaving the prepolymerization unit through the discharge valve 5, which is located upstream of the filtering unit 7. In some embodiments, the valves of the intermediate capacity pipe 19 include:

an intermediate capacity inlet valve 20, located upstream of the intermediate capacity pipe 19, for allowing the slurry to enter the intermediate capacity pipe 19; and an intermediate capacity outlet valve 21, located downstream of the intermediate capacity pipe 19, for allowing the slurry to leave the intermediate capacity pipe 19 and for conveying the slurry to the filtering unit 7.

In some embodiments, the intermediate capacity tube 19 permits the filtering unit 7 to avoid direct contact with the prepolymerization unit, or other operation units and to avoid pressure fluctuations.

In some embodiments, an intermediate capacity tube 19 with its intermediate capacity outlet valve 21 is provided and a valve between the intermediate capacity outlet valve 21 and the inlet valve 6 is not provided. In some embodiments, the two valves are in series.

In some embodiments, a second inert gas inlet valve 22 for flushing inert gas through the intermediate capacity pipe 19 is provided.

In some embodiments, the system 1 has a pressure sensor 23 and proper connecting piping for connecting the different components of system 1.

In FIG. 1, a process for collecting samples of a polymerization catalyst or a catalyst-containing polymer from an operation unit 2 is shown.

According to step a), a prefixed amount of product is extracted from the lower end 4 of the operation unit 2 through a discharge valve 5. Then, the product is directed towards a filtering unit 7 through an inlet valve 6, according to step b. Later, an inert gas is flushed through the filtering unit 7 by opening valve 18—step c)—and the filtering unit 7 is outgassed through the outlet valve 17—step d). After that, the filtering unit 7 is removed to collect the sample—step e).

In some embodiments and regarding FIG. 2, the operation unit 2 is a loop prepolymerization reactor.

While a slurry made from or containing prepolymerized polymerization catalyst, unreacted catalyst, and unreacted monomer is circulating in the loop prepolymerization unit, a prefixed amount of the slurry is extracted from the lower end 4 of the prepolymerization unit, through the discharge valve 5 located at nozzle 8, according to step a).

In some embodiments, the slurry is collected in the intermediate capacity pipe 19 through intermediate capacity inlet valve 20, according to step a').

Then, the slurry is directed towards a filtering unit 7 through the inlet valve 6, according to step b). In some embodiments, step b1) of outgassing the filtering unit 7, through the outlet valve 17, occurs.

Afterwards, step c) of flushing, an inert gas through the filtering unit 7 is carried out, to remove the unreacted monomer. As such, nitrogen or another inert gas is directed towards the filtering unit 7 and the inert gas is outgassed through the outlet valve 17 (step d)). In some embodiments, steps c) and d) are repeated three times to remove the monomer.

Finally, step e) of displacing the filtering unit 7 is carried out. This step allows collecting the prepolymerized polymerization catalyst sample.

In some embodiments, the operation unit 2 is a precontacting vessel, a vessel polymerization unit, or a polymerization reactor. In some embodiments, the product extracted is a powder/gas mixture, instead of a slurry. In some embodiments, the operation unit 2 is a precontacting vessel and the sample collected contains the polymerization catalyst. In some embodiments, the operation unit 2 is a prepolymerization unit and the sample contains a prepolymerized polymerization catalyst. In some embodiments, the operation unit 2 is a polymerization reactor and the sample contains polymer.

Examples

In some embodiments, system 1 is operated as follows:
System 1 is in standby condition: discharge valve 5, intermediate capacity inlet valve 20, intermediate capacity outlet valve 21, inlet valve 6, outlet valve 17, first inert gas inlet valve 18 and second inert gas inlet valve 22 are closed.
Intermediate capacity inlet valve 20 is opened.
Discharge valve 5 is opened, for collecting product in the intermediate capacity pipe 19.
Discharge valve 5 is closed.
Intermediate capacity inlet valve 20 is closed.
Inlet valve 6 is opened.
Intermediate capacity outlet valve 21 is opened, for transferring the product to the filtering unit 7.
Inlet valve 6 is closed.
Intermediate capacity outlet valve 21 is closed.
Outlet valve 17 is opened, for depressurizing from the bottom.
Pressure in the filtering unit 7 is measured by pressure sensor 23.
When pressure is lower than 0.5 barg, or equal to discharge header pressure, outlet valve 17 is closed.
Second inert gas inlet valve 22, intermediate capacity inlet valve 20, intermediate capacity outlet valve 21, and inlet valve 6 are opened, for pressurizing the intermediate capacity pipe 19 and the filtering unit 7 with nitrogen.
Pressure in the filtering unit 7 is measured by pressure sensor 23.
When pressure is higher than 3 barg, or equal to inert gas supply pressure, second inert gas inlet valve 22 is closed.
Outlet valve 17 is opened, for depressurizing.
Pressure in the filtering unit 7 is measured by pressure sensor 23.
When pressure is lower than 0.5 barg, or equal to discharge header pressure, outlet valve 17 is closed.
The last four step are repeated at least three times, (A) for removing the monomer wherein the operation unit 2 is a prepolymerization unit or (B) for flushing the inert gas to clean the product.
Intermediate capacity inlet valve 20 and intermediate capacity outlet valve 21 are closed.
Inlet valve 6 is closed.
The filtering unit 7 is displaced from system 1, for removing the sample. In some embodiments, the removal occurs under a fume hood.
The filtering unit 7 is emptied, cleaned, and reinstalled in system 1.

What is claimed is:

1. A process for collecting samples of a polymerization catalyst or of a catalyst-containing polymer from an operation unit, comprising an upper end and a lower end, of a polymerization plant, comprising the steps of:
   a) extracting a prefixed amount of product from the lower end of the operation unit through a discharge valve;
   b) directing the product towards a filtering unit through an inlet valve;
   c) flushing an inert gas through the filtering unit;
   d) outgassing the filtering unit, through an outlet valve;
   e) displacing the filtering unit, for collecting the sample.

2. A process according to claim 1, wherein, after step a), further comprises the step of:
   a1) collecting the product in an intermediate capacity pipe.

3. A process according to claim 1, wherein, after step b), further comprises the step of:
   b1) outgassing the filtering unit, through the outlet valve.

4. A process according to claim 1, wherein steps c) and d) are repeated at least three times.

5. A system for collecting samples of a polymerization catalyst or of a catalyst-containing polymer from an operation unit, comprising an upper end and a lower end, of a polymerization plant, wherein the system comprising:
   a discharge valve, connectable to the operation unit, for extracting a predetermined amount of product from the lower end of the operation unit;
   an inlet valve for conveying the product to a filtering unit;
   a filtering unit for filtering the product, the filtering unit being displaceable;
   a first inert gas inlet valve for flushing an inert gas through the filtering unit;
   an outlet valve for outgassing the filtering unit; and
   connection piping.

6. A system for collecting samples of a polymerization catalyst or a catalyst-containing polymer according to claim 5, wherein the filtering unit comprises:
   a head flange comprising an inlet opening;
   a bottom body, connectable to the head flange, comprising a filter housing and an outlet opening; and
   a mechanical filter located in the filter housing of the bottom body.

7. A system for collecting samples of a polymerization catalyst or a catalyst-containing polymer according claim 5, further comprising:
   an intermediate capacity pipe located upstream of the filtering unit, for containing a predetermined amount of product leaving the operation unit through the discharge valve;
   an intermediate capacity inlet valve located upstream of the intermediate capacity pipe; and
   an intermediate capacity outlet valve located downstream of the intermediate capacity pipe.

8. A system for collecting samples of a polymerization catalyst or a catalyst-containing polymer according to claim 7, further comprising a second inert gas inlet valve for flushing inert gas through the intermediate capacity pipe.

9. An operation unit of a polymerization plant comprising the system for collecting samples of a polymerization catalyst or polymer according to claim 5.

10. An operation unit according to claim 9, wherein the lower end of the operation unit comprises a rounded portion, jointed to two vertical portions, wherein a nozzle for connecting the discharge valve is positioned, thereby forming an angle $\alpha$ with the vertical portions.

11. An operation unit according to claim 10, wherein the angle $\alpha$ is of about 45°.

12. An operation unit according to claim 9, wherein the operation unit is a prepolymerization unit.

* * * * *